United States Patent [19]

Ng et al.

[11] Patent Number: 5,678,043
[45] Date of Patent: *Oct. 14, 1997

[54] DATA COMPRESSION AND ENCRYPTION SYSTEM AND METHOD REPRESENTING RECORDS AS DIFFERENCES BETWEEN SORTED DOMAIN ORDINALS THAT REPRESENT FIELD VALUES

[75] Inventors: Wee-Keong Ng; Chinya Venkataram Ravishankar, both of Ann Arbor, Mich.

[73] Assignee: The Regents of the University of Michigan, Ann Arbor, Mich.

[*] Notice: The portion of the term of this patent subsequent to Sep. 23, 2014, has been disclaimed.

[21] Appl. No.: 397,994

[22] Filed: Mar. 3, 1995

Related U.S. Application Data

[63] Continuation-in-part of Ser. No. 311,779, Sep. 23, 1994, Pat. No. 5,603,022.

[51] Int. Cl.$^6$ .......................................... G06F 7/00
[52] U.S. Cl. .................. 395/612; 395/602; 395/607; 364/715.02; 364/478.11; 341/106; 341/143
[58] Field of Search .................. 395/607, 602, 395/612; 364/715.02, 478.11; 341/106, 143

[56] References Cited

U.S. PATENT DOCUMENTS

| | | | |
|---|---|---|---|
| 4,315,105 | 2/1982 | Mozer | 395/2.1 |
| 4,361,893 | 11/1982 | Bonnerot | 375/245 |
| 4,464,650 | 8/1984 | Eastman et al. | 341/51 |
| 4,606,002 | 8/1986 | Waisman et al. | 395/603 |
| 4,868,570 | 9/1989 | Davis | 341/106 |
| 4,930,072 | 5/1990 | Agrawal et al. | 364/300 |
| 5,264,848 | 11/1993 | McGuffin | 341/94 |
| 5,270,712 | 12/1993 | Iyer et al. | 341/50 |
| 5,325,091 | 6/1994 | Kaplan et al. | 341/51 |
| 5,333,313 | 7/1994 | Heising | 395/601 |
| 5,412,384 | 5/1995 | Chang et al. | 341/179 |
| 5,481,472 | 1/1996 | Chung et al. | 364/491 |
| 5,546,575 | 8/1996 | Potter et al. | 395/612 |

*Primary Examiner*—Thomas G. Black
*Assistant Examiner*—Jean Raymond Homere
*Attorney, Agent, or Firm*—Harness, Dickey & Pierce, P.L.C.

[57] ABSTRACT

Records in the relational database are converted into ordinal numbers. The numbers are then sorted by a predetermined ordering rule. Next, for each record, the difference between the number and the preceding number is computed and this difference is then used to represent that record. Alternatively, for each record, the difference between the number and some other record's number that is within the same block is computed and the difference is then used to represent that record. The compression technique results in highly compressed data that can still be handled by conventional relational database software for record insertion, deletion and other standard database operations.

25 Claims, 10 Drawing Sheets

Figure 1

Table (a)

| $A_1$ | $A_2$ | $A_3$ | $A_4$ | $A_5$ |
|---|---|---|---|---|
| 001 | production | manager | D | 024 |
| 002 | marketing | supervisor | B | 035 |
| 003 | marketing | manager | C | 030 |
| 004 | marketing | part-time | B | 025 |
| 005 | personnel | supervisor | C | 034 |
| 006 | marketing | worker | C | 030 |
| 007 | personnel | manager | A | 035 |
| 008 | personnel | worker | C | 050 |
| 009 | production | worker | B | 030 |
| 010 | management | manager | B | 020 |
| 011 | management | supervisor | B | 020 |
| 012 | production | part-time | D | 040 |
| 013 | marketing | worker | D | 043 |
| 014 | personnel | worker | B | 035 |
| 015 | marketing | manager | B | 025 |
| 016 | production | manager | A | 020 |
| 017 | management | part-time | A | 032 |
| 018 | production | part-time | C | 030 |
| 019 | personnel | supervisor | D | 020 |
| 020 | personnel | manager | D | 020 |
| 021 | personnel | part-time | D | 025 |
| 022 | marketing | supervisor | A | 030 |
| 023 | management | worker | C | 020 |
| 024 | management | manager | A | 040 |
| 025 | production | worker | A | 022 |
| 026 | marketing | manager | A | 032 |
| 027 | personnel | manager | C | 028 |
| 028 | personnel | part-time | B | 030 |
| 029 | production | part-time | A | 035 |
| 030 | production | supervisor | A | 030 |
| 031 | management | worker | B | 035 |
| 032 | management | supervisor | C | 032 |
| 033 | marketing | manager | D | 025 |
| 034 | personnel | worker | A | 022 |
| 035 | production | worker | D | 025 |
| 036 | marketing | part-time | D | 020 |
| 037 | personnel | supervisor | B | 020 |
| 038 | management | worker | D | 045 |
| 039 | marketing | part-time | A | 020 |
| 040 | personnel | part-time | A | 030 |
| 041 | production | supervisor | C | 035 |

Table (b)

| $A_1$ | $A_2$ | $A_3$ | $A_4$ | $A_5$ |
|---|---|---|---|---|
| 001 | 1 | 1 | 2 | 024 |
| 002 | 2 | 0 | 1 | 035 |
| 003 | 2 | 1 | 3 | 030 |
| 004 | 2 | 3 | 1 | 025 |
| 005 | 3 | 0 | 3 | 034 |
| 006 | 2 | 2 | 3 | 030 |
| 007 | 3 | 1 | 0 | 035 |
| 008 | 3 | 2 | 3 | 050 |
| 009 | 1 | 2 | 1 | 030 |
| 010 | 0 | 1 | 1 | 020 |
| 011 | 0 | 0 | 1 | 020 |
| 012 | 1 | 3 | 2 | 040 |
| 013 | 2 | 2 | 2 | 043 |
| 014 | 3 | 2 | 1 | 035 |
| 015 | 2 | 1 | 1 | 025 |
| 016 | 1 | 1 | 0 | 020 |
| 017 | 0 | 3 | 0 | 032 |
| 018 | 1 | 3 | 3 | 030 |
| 019 | 3 | 0 | 2 | 020 |
| 020 | 3 | 1 | 2 | 020 |
| 021 | 3 | 3 | 2 | 025 |
| 022 | 2 | 0 | 0 | 030 |
| 023 | 0 | 2 | 3 | 020 |
| 024 | 0 | 1 | 0 | 040 |
| 025 | 1 | 2 | 0 | 022 |
| 026 | 2 | 1 | 0 | 032 |
| 027 | 3 | 1 | 3 | 028 |
| 028 | 3 | 3 | 1 | 030 |
| 029 | 1 | 3 | 0 | 035 |
| 030 | 1 | 0 | 0 | 030 |
| 031 | 0 | 2 | 1 | 035 |
| 032 | 0 | 0 | 3 | 032 |
| 033 | 2 | 1 | 2 | 025 |
| 034 | 3 | 2 | 0 | 022 |
| 035 | 1 | 2 | 2 | 025 |
| 036 | 2 | 3 | 2 | 020 |
| 037 | 3 | 0 | 1 | 020 |
| 038 | 0 | 2 | 2 | 045 |
| 039 | 2 | 3 | 0 | 020 |
| 040 | 3 | 3 | 0 | 030 |
| 041 | 1 | 0 | 3 | 035 |

Figure 2

Table (a)

| $A_{r(1)}$ | $A_{r(2)}$ | $A_{r(3)}$ | $A_{r(4)}$ | $A_{r(5)}$ | $N_R$ |
|---|---|---|---|---|---|
| 0 | 0 | 1 | 011 | 020 | 17812 |
| 0 | 0 | 3 | 032 | 032 | 53280 |
| 0 | 1 | 0 | 024 | 040 | 68648 |
| 0 | 1 | 1 | 010 | 020 | 83220 |
| 0 | 2 | 1 | 031 | 035 | 151459 |
| 0 | 2 | 2 | 038 | 045 | 168749 |
| 0 | 2 | 3 | 023 | 020 | 183188 |
| 0 | 3 | 0 | 017 | 032 | 198816 |
| 1 | 0 | 0 | 030 | 030 | 266014 |
| 1 | 0 | 3 | 041 | 035 | 316579 |
| 1 | 1 | 0 | 016 | 020 | 329748 |
| 1 | 1 | 2 | 001 | 024 | 360600 |
| 1 | 2 | 0 | 025 | 022 | 396438 |
| 1 | 2 | 1 | 009 | 030 | 410782 |
| 1 | 2 | 2 | 035 | 025 | 430489 |
| 1 | 3 | 0 | 029 | 035 | 462499 |
| 1 | 3 | 2 | 012 | 040 | 493096 |
| 1 | 3 | 3 | 018 | 030 | 510238 |
| 2 | 0 | 0 | 022 | 030 | 527134 |
| 2 | 0 | 1 | 002 | 035 | 540963 |
| 2 | 1 | 0 | 026 | 032 | 593184 |
| 2 | 1 | 1 | 015 | 025 | 608153 |
| 2 | 1 | 2 | 033 | 025 | 626841 |
| 2 | 1 | 3 | 003 | 030 | 639390 |
| 2 | 2 | 2 | 013 | 043 | 689835 |
| 2 | 2 | 3 | 006 | 030 | 705310 |
| 2 | 3 | 0 | 039 | 020 | 725908 |
| 2 | 3 | 1 | 004 | 025 | 737817 |
| 2 | 3 | 2 | 036 | 020 | 758292 |
| 3 | 0 | 1 | 037 | 020 | 807572 |
| 3 | 0 | 2 | 019 | 020 | 821652 |
| 3 | 0 | 3 | 005 | 034 | 836258 |
| 3 | 1 | 0 | 007 | 035 | 852899 |
| 3 | 1 | 2 | 020 | 020 | 887316 |
| 3 | 1 | 3 | 027 | 028 | 904604 |
| 3 | 2 | 0 | 034 | 022 | 921878 |
| 3 | 2 | 1 | 014 | 035 | 935715 |
| 3 | 2 | 3 | 008 | 050 | 967730 |
| 3 | 3 | 0 | 040 | 030 | 988190 |
| 3 | 3 | 1 | 028 | 030 | 1003038 |
| 3 | 3 | 2 | 021 | 025 | 1018521 |

Table (b)

| $A_{r(1)}$ | $A_{r(2)}$ | $A_{r(3)}$ | $A_{r(4)}$ | $A_{r(5)}$ | $R_d$ |
|---|---|---|---|---|---|
| 0 | 0 | 2 | 021 | 012 | 35468 |
| 0 | 0 | 0 | 120 | 008 | 15368 |
| 0 | 0 | 0 | 113 | 108 | 14572 |
| 0 | 1 | 0 | 021 | 015 | 68239 |
| 0 | 0 | 1 | 007 | 010 | 17290 |
| 0 | 0 | 0 | 112 | 103 | 14439 |
| 0 | 0 | 0 | 122 | 012 | 15628 |
| 0 | 1 | 0 | 012 | 126 | 67198 |
| 0 | 0 | 3 | 011 | 005 | 50565 |
| 0 | 0 | 0 | 102 | 113 | 13169 |
| 0 | 0 | 1 | 113 | 004 | 30852 |
| 0 | 0 | 2 | 023 | 126 | 35838 |
| 0 | 0 | 0 | 112 | 008 | 14344 |
| 0 | 0 | 1 | 025 | 123 | 19707 |
| 0 | 0 | 1 | 122 | 010 | 32010 |
| 0 | 0 | 1 | 111 | 005 | 30597 |
| 0 | 0 | 1 | 005 | 118 | 17142 |
| 0 | 0 | 1 | 004 | 000 | 16896 |
| 0 | 0 | 0 | 108 | 005 | 13829 |
| 0 | 0 | 3 | 023 | 125 | 52221 |
| 0 | 0 | 0 | 116 | 121 | 14969 |
| 0 | 0 | 1 | 018 | 000 | 18688 |
| 0 | 0 | 0 | 098 | 005 | 12549 |
| 0 | 0 | 3 | 010 | 013 | 50445 |
| 0 | 0 | 0 | 120 | 115 | 15475 |
| 0 | 0 | 1 | 032 | 118 | 20598 |
| 0 | 0 | 0 | 093 | 005 | 11909 |
| 0 | 0 | 1 | 031 | 123 | 20475 |
| 0 | 0 | 3 | 001 | 000 | 49280 |
| 0 | 0 | 0 | 110 | 000 | 14080 |
| 0 | 0 | 0 | 114 | 014 | 14606 |
| 0 | 0 | 1 | 002 | 001 | 16641 |
| 0 | 0 | 2 | 012 | 113 | 34417 |
| 0 | 0 | 1 | 007 | 008 | 17288 |
| 0 | 0 | 1 | 006 | 122 | 17274 |
| 0 | 0 | 0 | 108 | 013 | 13837 |
| 0 | 0 | 1 | 122 | 015 | 32015 |
| 0 | 0 | 1 | 031 | 108 | 20460 |
| 0 | 0 | 0 | 116 | 000 | 14848 |
| 0 | 0 | 0 | 120 | 123 | 15483 |

Figure 8

Table (a)

| $A_1$ | $A_2$ | $A_3$ | $A_4$ | $A_5$ |
|---|---|---|---|---|
| 00 | production | part-time | 24 | 32 |
| 01 | marketing | director | 12 | 31 |
| 02 | management | worker1 | 29 | 21 |
| 03 | marketing | worker2 | 30 | 42 |
| 04 | management | supervisor | 27 | 27 |
| 05 | production | secretary | 23 | 25 |
| 06 | production | secretary | 34 | 28 |
| 07 | production | worker1 | 32 | 37 |
| 08 | marketing | worker2 | 39 | 37 |
| 09 | production | executive | 31 | 25 |
| 10 | marketing | part-time | 19 | 21 |
| 11 | production | secretary | 28 | 22 |
| 12 | production | manager | 32 | 34 |
| 13 | marketing | manager | 38 | 34 |
| 14 | marketing | worker2 | 26 | 32 |
| 15 | personnel | supervisor | 33 | 22 |
| 16 | production | part-time | 34 | 28 |
| 17 | marketing | part-time | 25 | 27 |
| 18 | marketing | manager | 41 | 28 |
| 19 | production | manager | 32 | 25 |
| 20 | marketing | secretary | 39 | 29 |
| 21 | marketing | manager | 50 | 26 |
| 22 | production | manager | 31 | 33 |
| 23 | personnel | manager | 26 | 32 |
| 24 | production | worker1 | 34 | 26 |
| 25 | personnel | worker2 | 45 | 16 |
| 26 | production | worker2 | 39 | 37 |
| 27 | marketing | worker1 | 40 | 27 |
| 28 | marketing | supervisor | 30 | 44 |
| 29 | production | manager | 24 | 30 |
| 30 | marketing | worker2 | 33 | 32 |
| 31 | marketing | part-time | 32 | 42 |
| 32 | personnel | supervisor | 19 | 31 |
| 33 | production | part-time | 27 | 26 |
| 34 | production | supervisor | 32 | 30 |
| 35 | production | manager | 36 | 39 |
| 36 | management | worker1 | 26 | 20 |
| 37 | production | part-time | 26 | 27 |
| 38 | production | supervisor | 35 | 25 |
| 39 | marketing | supervisor | 39 | 33 |
| 40 | production | worker2 | 35 | 28 |
| 41 | marketing | manager | 32 | 24 |
| 42 | marketing | manager | 31 | 24 |
| 43 | marketing | supervisor | 35 | 19 |
| 44 | marketing | executive | 55 | 23 |
| 45 | marketing | manager | 32 | 27 |
| 46 | production | worker2 | 37 | 31 |
| 47 | personnel | secretary | 24 | 26 |
| 48 | production | worker2 | 30 | 32 |
| 49 | marketing | worker2 | 39 | 31 |

Table (b)

| $A_1$ | $A_2$ | $A_3$ | $A_4$ | $A_5$ |
|---|---|---|---|---|
| 00 | 3 | 09 | 24 | 32 |
| 01 | 4 | 12 | 12 | 31 |
| 02 | 2 | 06 | 29 | 21 |
| 03 | 4 | 07 | 30 | 42 |
| 04 | 2 | 10 | 27 | 27 |
| 05 | 3 | 05 | 23 | 25 |
| 06 | 3 | 05 | 34 | 28 |
| 07 | 3 | 06 | 32 | 37 |
| 08 | 4 | 07 | 39 | 37 |
| 09 | 3 | 04 | 31 | 25 |
| 10 | 4 | 09 | 19 | 21 |
| 11 | 3 | 05 | 28 | 22 |
| 12 | 3 | 08 | 32 | 34 |
| 13 | 4 | 08 | 38 | 34 |
| 14 | 4 | 07 | 26 | 32 |
| 15 | 5 | 10 | 33 | 22 |
| 16 | 3 | 09 | 34 | 28 |
| 17 | 4 | 09 | 25 | 27 |
| 18 | 4 | 08 | 41 | 28 |
| 19 | 3 | 08 | 32 | 25 |
| 20 | 4 | 05 | 39 | 29 |
| 21 | 4 | 08 | 50 | 26 |
| 22 | 3 | 08 | 31 | 33 |
| 23 | 5 | 08 | 26 | 32 |
| 24 | 3 | 06 | 34 | 26 |
| 25 | 5 | 07 | 45 | 16 |
| 26 | 3 | 07 | 39 | 37 |
| 27 | 4 | 06 | 40 | 27 |
| 28 | 4 | 10 | 30 | 44 |
| 29 | 3 | 08 | 24 | 30 |
| 30 | 4 | 07 | 33 | 32 |
| 31 | 4 | 09 | 32 | 42 |
| 32 | 5 | 10 | 19 | 31 |
| 33 | 3 | 09 | 27 | 26 |
| 34 | 3 | 10 | 32 | 30 |
| 35 | 3 | 08 | 36 | 39 |
| 36 | 2 | 06 | 26 | 20 |
| 37 | 3 | 09 | 26 | 27 |
| 38 | 3 | 10 | 35 | 25 |
| 39 | 4 | 10 | 39 | 33 |
| 40 | 3 | 07 | 35 | 28 |
| 41 | 4 | 08 | 32 | 24 |
| 42 | 4 | 08 | 31 | 24 |
| 43 | 4 | 10 | 35 | 19 |
| 44 | 4 | 04 | 55 | 23 |
| 45 | 4 | 08 | 32 | 27 |
| 46 | 3 | 07 | 37 | 31 |
| 47 | 5 | 05 | 24 | 26 |
| 48 | 3 | 07 | 30 | 32 |
| 39 | 4 | 07 | 39 | 31 |

Figure 9

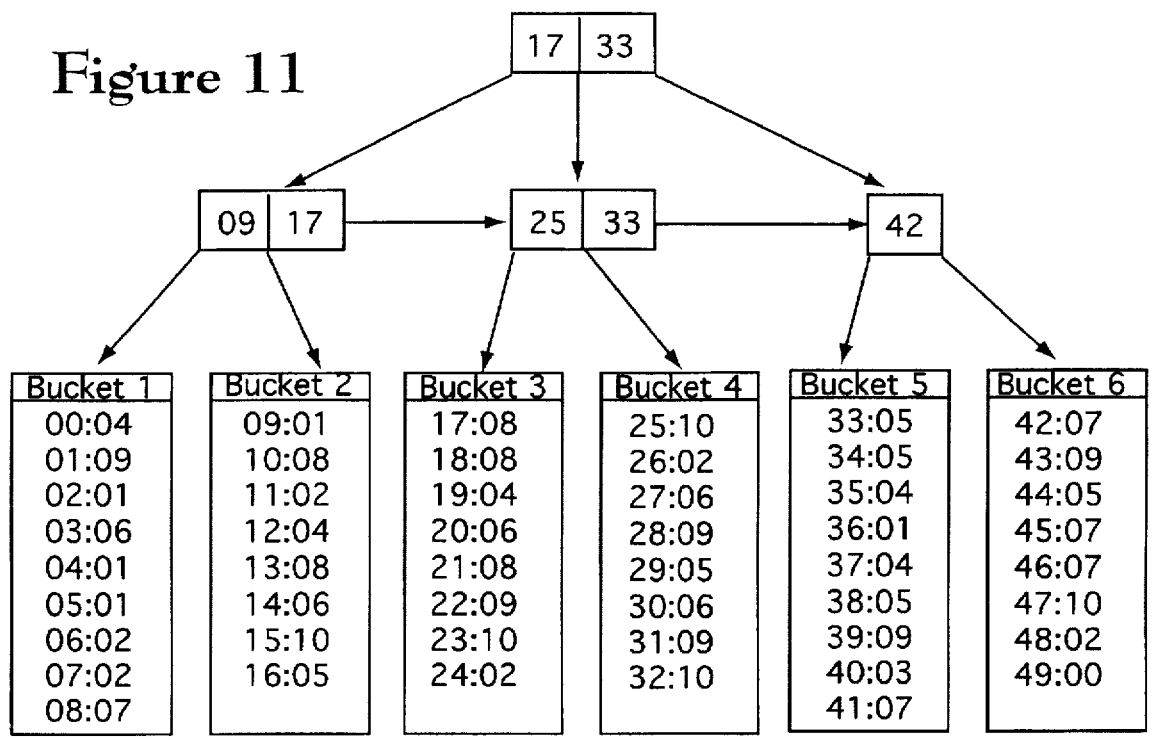

DATA COMPRESSION AND ENCRYPTION SYSTEM AND METHOD REPRESENTING RECORDS AS DIFFERENCES BETWEEN SORTED DOMAIN ORDINALS THAT REPRESENT FIELD VALUES

CROSS-REFERENCE TO RELATED APPLICATION

This is a continuation-in-part application of application Ser. No. 08/311,779, filed Sep. 23, 1994, entitled "Data Compression System and Method," now U.S. Pat. No. 5,603,022. +gi This invention was made with government support under grant C-CSN-9106-94, awarded by the Consortium for an International Earth Science Information Network (CIESIN). The government has certain rights in the invention.

BACKGROUND AND SUMMARY OF THE INVENTION

Many applications deal with large amounts of data organizable as tuples, an example of such applications being databases. As the amount of data to be dealt with by such applications increases, their performance becomes constrained by the speed at which data can be read or written. Such an application is said to be input-output (I/O) bound. Unfortunately, technological progress in the computing arena has produced dramatic improvements in all aspects except I/O. I/O-bound applications are therefore the hardest to design and manage.

The usual approach when confronted with an I/O-bound application is to reduce the amount of I/O required. This goal may be realized sometimes by cleverly designing the application, so that it computes some of the data instead of reading it. However, this approach is limited in applicability and is often impossible to realize. A far more effective approach is usually to reduce the volume of data to be read by compressing it prior to I/O. The information content of the data is preserved, but the volume it occupies is greatly reduced.

A number of approaches are available for compressing data. Unfortunately, they are generally unsuitable for database-like applications, which require random access to data. Our method is specially designed to work for this class of applications. Most other existing methods assume that data are produced and consumed serially in a pipelined fashion. That is not always a valid assumption, and is definitely invalid in the database domain.

The present invention provides a method to compress and store data in relational databases that overcomes some of the deficiencies of prior art systems. In our method, each record $R_i$ is simply treated as a number $n_i$. These numbers (or records) are next sorted according to some predetermined ordering rule (usually ascending or descending order). Next, for each record $R_i$, we compute the difference $d_i$ between the number $n_i$ and some other number $n_j$ corresponding to another record $R_j$. Each such record $R_i$ is then represented by the corresponding difference $d_i$.

This method exploits the characteristic that records share common field values. Arranging them in this fashion makes explicit the amount of similarity among records; records that are closer together have more common field values. Such commonality represents a redundancy that can be eliminated by capturing the distances among records. Thus, the set of records are replaced by their distances.

The invention has the following advantages: (1) differences between records are smaller than the records themselves, so using differences requires fewer bits of storage, achieving compression; (2) the original records can all be recovered, so information is not lost; (3) the encoding and decoding processes can be localized, so that only relevant records desired in a database query need be decoded and processed, avoiding costly decoding of the entire table when only a small subset of records are needed; (4) the method continues to support standard database operations such as insertions, deletions and updates; and (5) the encoding and decoding processes are efficient so that fast retrieval is possible.

BRIEF DESCRIPTION OF THE DRAWINGS

FIG. 1 illustrates a relation and its transformation after domain mapping in accordance with the invention;

FIG. 2 is a series of tables illustrating tuple differential coding in accordance with the invention, Table (a) shows the tuples lexicographically sorted. Table (b) shows the tuples as differences. Columns $NR$ and $R_d$ show the result of mapping each tuple into a number by $\phi$;

FIG. 8 illustrates a relation and its transformation after domain mapping in accordance with the alternative differencing aspects of the invention;

FIG. 9 is a series of tables illustrating alternative tuple differential codings in accordance with the invention. Table (a) shows the tuples lexicographically sorted. Tables (b) and (c) show the tuples as differences where the reference tuples are the first and middle tuple of each block respectively. Columns $NR$ and $R_d$ show the result of mapping each tuple into a number by $\phi$;

FIG. 11 is a tree structure chart illustrating the secondary index for $A_5$ the buckets providing a level of indirection between attributes of $A_5$ and the difference tuples R;

FIG. 12 is a series of blocks illustrating tuple insertion in a TDC coded block, the two tables above being before insertion and the two tables below being after insertion.

DESCRIPTION OF THE PREFERRED EMBODIMENT

Encoding/Decoding Algorithm

Figure 3:
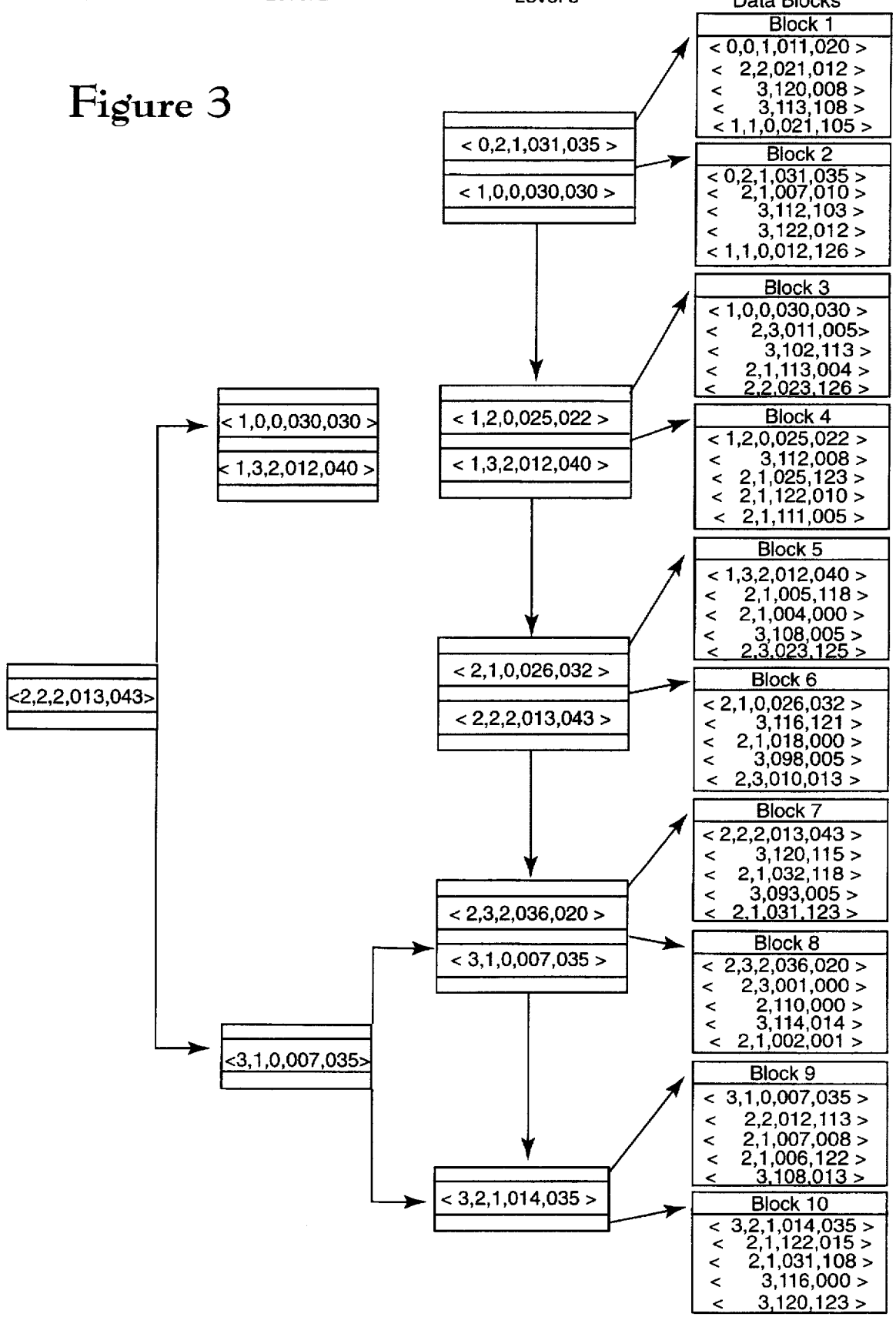
FIG. 3 is a tree structure chart illustrating the primary index and showing the manner of storing data blocks containing difference tuples in $\phi$ order, illustrating that the search key is an entire tuple with each block beginning with a head tuple and followed by difference tuples.

We first define some terminology. A database is relational if the data it contains is represented in tabular form. A record or tuple is a row in such a table. Each record represents a real-world entity (e.g., an employee, a department, an auto part and so on) and comprises a fixed number of fields that contain information relevant to the entity. Thus, a tuple (record) representing an employee may have social security numbers as a field. The term relation is synonymous with the term table.

Our method and apparatus involves the reorganization of records at the physical level (the disk-storage level) of a database. It exploits relationships among records to compress and store them. The encoding process, which we call Tuple Differential Coding (TDC), proceeds in several steps: (1) each attribute value is mapped into a number, thus transforming a record into a collection of numeric fields, (2) each record is treated as a single number and the table of records is sorted in some predetermined order, (3) the records are partitioned into subsets so that each subset is small enough to be stored in a disk block, (4) each record in a partition is replaced by the numerical difference between itself and some other record in the same block. The result of TDC is a table of differences, as will be explained further. The above steps are elaborated below. Throughout this section and this disclosure, we shall be using the relation in the following example to illustrate the concepts involved.

EXAMPLE 1

Table (a) in FIG. 1 shows a relation R with five field domains A1, A2, A3, A4, A5 denoting the employee number, department, job title, insurance grade and income in thousands respectively. The size of each domain, i.e., the number of different field values, is 128, 4, 4, 4, and 128 respectively. Table (b) shows the same relation, except that the field values have all been mapped to numbers. This is usually the raw form in which a statistical data set is available; i.e., a file of numerals corresponding to contiguous records. We preserve tuple identity by displaying them as individual tuples. The relation in the figure has been partitioned into blocks. Each compression technique compresses a block individually.

Field Value Mapping (Step 1)

The ability to map every domain systematically to a set of integers is fundamental to TDC. This seems a tall order because certain field domains appear unmappable at first blush, an example being the address domain. However, the following explains how this mapping is possible.

Descriptive Fields

Fields A2, A3, A4 in Table (a) of FIG. 1 are descriptive domains. These non-numeric field domains are usually used in queries to set certain criteria for retrieving tuples. An example is: $\sigma_{dept=marketing}(R)$, which retrieves all tuples whose department field is marketing. The domains of these fields are usually known in advance. Hence, mapping them is easy as the domain size places a limit on the number of possible values the field may assume.

Numeric Fields

Numeric domains are usually the target of queries, i.e., they constitute the results of queries. Field A5 in Table (a) is a numeric domain. Since the field values of these domains are numeric, an automatic upper bound is already set on the domain size. Consider a five character income field. The range of values is from 0 to 99999. Clearly, each of the fields in the range is already mapped to an integer. So numeric domains are naturally mapped.

Variable-Length Fields

Fields like address and name are seemingly difficult to map. There are two steps to resolve this problem: (1) fix a maximum length for the characters constituting the field; any field value that is greater than the maximum length is truncated, and (2) establish a sub-domain for each character up to the maximum length. The code of a field value is then the radix m integer where m is the size of these character domains. Example 2 below illustrates this concept.

EXAMPLE 2

Consider the following name occurring in a maximum space of twenty characters:

JAMES_K._MADISON_____ where _ represents an empty space. Let each character be a domain. Since the number of possible characters is no more than 256 (including the special characters), we can generously set 256 as the size of each domain. Let the ordinal position of a character within the domain be its code. Then the code for the entire name is simply the name expressed as a radix 256 number. For instance, let the integer code for the attribute James K. Madison be k. Then, $$k = J \times 256^{19} + A \times 256^{18} + M \times 256^{17} + \ldots + \_ \times 256^{0}$$
$$= 74 \times 256^{19} + 65 \times 256^{18} + 77 \times 256^{18} + \ldots + 32 \times 256^{0}$$

However large k may be, it is a string of bits in binary representation, and is no different in principle from James K. Modeson as characters. We shall see in the next section that every tuple is bit-compacted so that the numeric attribute values comprising the tuple are squeezed together. After compaction, a tuple may be taken as a string of bits; its constituent attributes may be ignored.

Record mapping (Step 2)

In this subsection, we describe the mapping and differencing method more formally. There are two main concepts discussed in this section: record mapping and attribute ranking.

First, we explain how to treat each tuple as a number. Commonly used number representation systems are based on the assumption of a fixed radix or base b. Digits are always in the range $0, \ldots, (b-1)$. For example, the decimal system uses a radix of 10, with digits $0, \ldots, 9$, and the binary system uses a radix of 2, with digits 0, 1. However, it is also possible to use mixed-radix systems in which the base varies for each digit. In the preferred embodiment each tuple is treated as a mixed radix number, with the value in each field representing a digit. The radix or base for each such digit is the size of the corresponding field domain (the number of possible values for that field).

Second, we discuss the concept of attribute ranking for tuples. The information content of a record is unaffected by the order in which its fields appear. Thus, fields may be permuted arbitrarily. However, the order in which fields appear has a very significant effect on the compression achievable by sorting and differencing the tuples. Thus, the preferred embodiment rearranges the fields in records, as described below, to achieve the maximum compression.

The remainder of this subsection is a more formal description of the concepts outlined above. The next subsection describes how to support standard database operations using our method.

A relation scheme $\mathcal{R}=<<A,A2,\ldots,A_n>>$ is the Cartesian product of the set of fields, i.e., $\mathcal{R}=A_1 \times A_2 \times \ldots \times A_n$. It is an n-dimensional space where each tuple is a point in the space. A relation R is a subset of $\mathcal{R}$, i.e., R is a set points in the n-dimensional space. Tuples in a relation exhibit cluster locality in that tuples share certain fields with other tuples. For instance, one finds many people (tuples) belonging to the same department (field) or sharing having the same job-title (field) in an employee relation. Geometrically, tuples form clusters in the n-dimensional space. In order to map a record, which is now a collection of numbers, into a numeric number, we need (1) a field ranking rule and (2) tuple ordering rule.

Field Ranking Rule

In relational database, a tuple is a collection of fields. The ordering of fields within a tuple is irrelevant to the definition of the tuple. However, this ordering or ranking is important in the context of the tuple ordering rule. For instance, the ranking of fields affect the result of Equation A.1. Therefore, the preferred embodiment uses both a tuple ordering rule and a field ranking rule to completely map a tuple into a numeric value.

Tuple Ordering Rule

All points in $\mathcal{R}$ may be totally ordered via an ordering rule. One example is the lexicographical order defined by function $\phi: \mathcal{R} \to N\mathcal{R}$, where $$N_{\mathcal{R}} = \{0, 1, \ldots, \|\mathcal{R}\| - 1\} \text{ and } \|\mathcal{R}\| = \prod_{i=1}^{n} |A_i| \quad (A.1)$$

$$\phi(a_1, a_2, \ldots, a_n) = \sum_{i=1}^{n} \left( a_i \prod_{j=i+1}^{n} |A_j| \right)$$

for all $<a_1, a_2, \ldots, a_n> \in \mathcal{R}$. A tuple is generally enclosed in angle brackets. When used as an argument of a function, the angle brackets are omitted when no confusion arises. The inverse of $\phi$ is defined as:

$$\phi^{-1}(e) = <a_1', a_2', \ldots a_n'> \quad (A.2)$$

for all $e \in N\mathcal{R}$ and $i = 1, 2, \ldots, n-1$, $$a_i' = \left\lfloor \frac{d_{i-1}^r}{\prod_{j=i+1}^{n} |A_j|} \right\rfloor \quad (A.3)$$

$$a_i^r = d_{i-1}^r - a_i' \prod_{j=i+1}^{n} |A_j| \quad (A.4)$$

where $a_o^r = e$ and $a_n' = a_{n-1}^r$.

Given a tuple $t \in \mathcal{R}$, $\phi$ converts it to a unique integer $\phi(t)$ which represents its ordinal position within the $\mathcal{R}$ space. Given two tuples $t_i, t_j \in \mathcal{R}$, we may define a total order based on $\phi$, denoted by $t_i < t_j$, such that $t_i$ precedes $t_j$ if and only if $\phi(t_i) < \phi(t_j)$.

EXAMPLE 3

Continuing with the example relation R in FIG. 1, the results of the subsequent operations of TDC is illustrated in FIG. 2. The tuples are lexicographically ordered into Table (a). Notice that the fields have been reordered under the permutation $\tau$ defined as:

$$\tau = \begin{pmatrix} 12345 \\ 23415 \end{pmatrix}$$

Column $N\mathcal{R}$ shows the ordinal numbers of the corresponding tuples.

Differential Coding (Step 3)

Due to the similarity among tuples of a cluster, one may capture the difference among these tuples instead of storing the tuples explicitly. If these differences require less space for storage on average than the original tuples, compression is achieved. An example is given below:

EXAMPLE 4

Table (b) of FIG. 2 is the result of computing the differences between consecutive pairs of tuples in Table (a). For instance, the first difference $$\begin{aligned} 35468 &= \phi(0, 0, 2, 021, 012) \\ &= \phi(0, 0, 3, 032, 032) - \phi(0, 0, 1, 011, 020) \\ &= 53280 - 17812 \end{aligned}$$

Our invention permits the use of any form of differential coding within a block. The above example is just one method. In general, we may choose any tuple in the block as the reference tuple and encode the other tuples with respect to it. This concept is explained lastly.

Since the differences are numerically smaller than the tuples, they require fewer bytes of storage, as illustrated by the leading zeroes in each tuple difference. By using run-length coding to encode these zeroes, compression is achieved. For instance, the difference $<0,0,0,120,008>$ is coded into $<3,120,008>$ where the three leading zeroes are replaced by the count 3.

In essence, TDC performs differential coding on pairwise consecutive tuples of a relation that is totally ordered by a relation $\phi$, hence giving rise to its name. The result of encoding is the set of differences as illustrated by column $R_d$ Of Table (b) in FIG. 2. The differences, which are stored in binary representation, are actually the bit-wise concatenation of the respective tuple-differences in binary representations. For instance, the first tuple-difference is:

$$0_{10}\ 0_{10}\ 2_{10}\ \ 021_{10}\ \ 012_{10}$$
$$= 00_2\ 00_2\ 10_2\ 0010101_2\ 0001100_2$$
$$= 0000_2 1000_2 1010_2 1000_2\ \ 1100_2$$
$$= 08\alpha 8c_{16}$$
$$= 35468_{10}$$

Supporting Standard Database Operations

Since our compression method is designed for use at the lowest levels of a database system, it is important to understand how it might interact with other system components, and particularly, whether its use might require changes to their structure. In this section, we demonstrate that no re-thinking or re-design of other database system components is required, and that our method may be integrated cleanly with standard approaches to structuring them. In particular, we now consider how access mechanisms may be constructed on the coded tuples, and how the tuples may be retrieved and modified. We focus on demonstrating the use of our method with standard access and retrieval mechanisms.

We have restricted our attention to these basic operations rather than to queries for several reasons: (1) All queries, simple or complex, reduces to a set of basic tuple operations. (2) The variety of queries is too large to derive a set of representative, typical queries. The feasibility of these operations on a compressed database carries over to more complex queries which are built upon them.

Access method

The record mapping, where function φ (Equation 1) is one instance of, defines a clustering order among tuples. FIG. 3 shows the placement of the difference-tuples of Table (b) in FIG. 2 into 10 data blocks, corresponding to the demarcations shown in the table.

Each block begins with a head tuple which is the numerically smallest tuple in the block. All tuples following the head tuple are difference tuples. Notice that the leading zeroes of the difference tuples are replaced by a number indicating the counts of the number of leading zero (run-length coding). Thus, the first difference tuple <2,2,021, 012> in block 1 may be decoded into <0,0,2,021,012>. The head tuple can be arithmetically added (via mixed-radix addition) to the differences to derive the actual tuples. For instance, block 2 begins with head tuple <0,2,1,031,035> because the first difference tuple <0,0,1,007,010>=<0,2,2, 038,045>−<0,2,1,031,035> (see Table [a] of FIG. 2). The purpose of starting a block with a head tuple is to restrict the scope of decompression to within a data block. If only a block is searched, the difference tuples may be decoded immediately without decompressing an preceding blocks. Hence, access is localized.

Figures 4, 5:
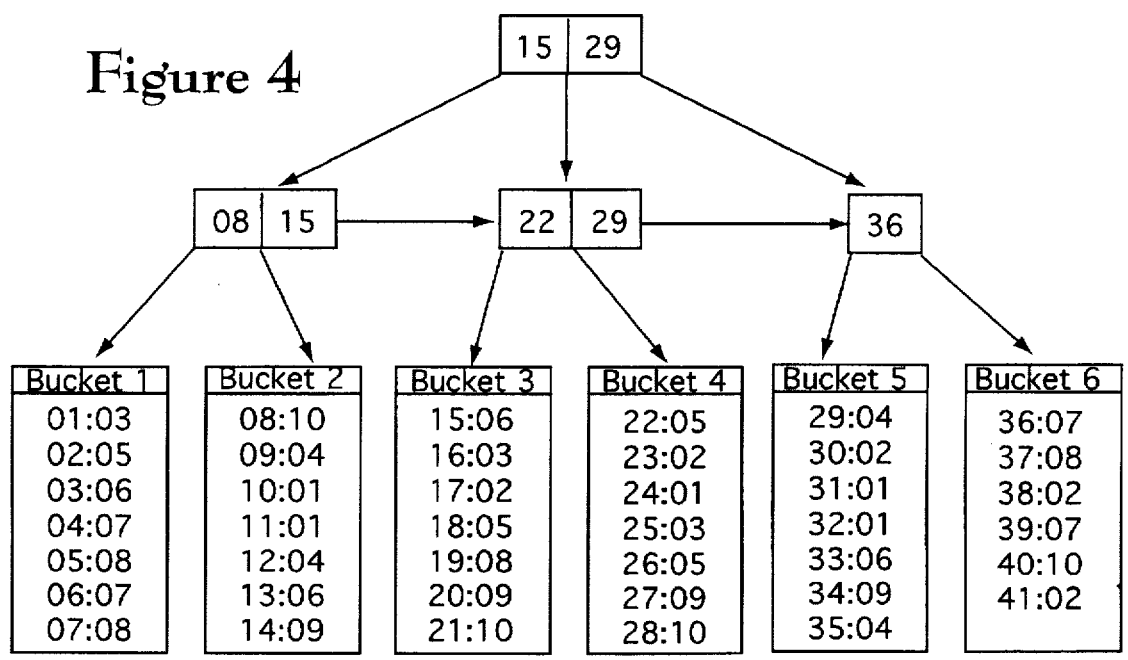
FIG. 4 is a tree structure chart illustrating the secondary index for $A_4$ the buckets providing a level of indirection between fields of $A_4$ and the difference tuples R.
FIG. 5 is a series of blocks illustrating tuple insertion in a TDC coded block, the three tables above being before insertion and the three tables below being after insertion.

In order to permit random access, an index scheme is constructed. FIG. 4 shows an order-3 B$^+$ tree index where A$_4$ is the search key. Since the relation is physically clustered via φ, the index is non-clustering and secondary. This explains the extra level of indirection provided by the buckets in the figure. Suppose we wish to execute σ$_{A4=34}$(R). Starting with the root index node, we follow the pointer to the last index node <36> since 34 is after the last key 29 in the root node. Following the first link in this index node, bucket 5 is reached, indicating that the tuple resides in disk block 9. The combination of head tuples and indices realize random localized access to a compressed database.

For the other two techniques, the same mechanism is applicable. Assuming the tuples are ordered via some attribute A$_k$, there is a key associated with each compressed data block. A tree index may then be defined upon A$_k$.

Tuple Insertion and Deletion

How are tuple insertion and deletion supported in a compressed database? Suppose we wish to insert in our previous database the tuple t=<1,1,0,016,021>, which differs from <1,1,0,016,020> in the last attribute value. We need a means of locating the block which contains tuples that are physically ordered in the neighborhood of t. We realize this by constructing an order-3 B$^+$ tree index using φ as the search key, as shown in FIG. 3. Since φ orders the tuples physically, this is a primary index, which we call the basic index. Key comparison while traversing the index is accomplished by comparing entire tuples. With this index, data block 3 is found to be the candidate block for inserting t, and is updated as shown in FIG. 5.

Notice that only tuples succeeding t are recomputed, and that the changes are confined to the affected block. For tuple deletion, the basic index is similarly used to locate the data block, and changes made within the block. Tuple modification may simply be defined as a combination of tuple insertion and deletion.

In summary, standard database operations are the same even when the database is compressed. The only difference is that the search key of the primary index is the entire tuple. All other indices are non-clustering and secondary, as in standard databases. An advantage of a compressed database is that the storage requirements for the indices will be reduced because the number of data blocks for storing the database has been reduced by compression. Although we have illustrated the use of tree indices as the access mechanisms, we do not preclude the use of other methods such as hashing.

Working Models

We have implemented TDC and applied it to the compression of census data. The 1990 Public User Microdata Samples (PUMS) from the US Bureau of Census [9] contain records representing 5% and 1% samples of the housing units in the U.S. and of persons residing in them. The 5% PUMS comes in a set of 52 ASCII text files with a total size of approximately 4 gigabytes, each corresponding to the samples taken from a state.

With TDC, we achieve a compression ratio of approximately 80% consistently on each of the text files comprising the 1% PUMS. Let B and A$_{TDC}$ be the size of a text file before and after compression by TDC respectively. Then A$_{TDC}$/B=0.2. With bit-compression on the text file alone, a compression ratio of approximately 70% is achieved. Let A$_{bit}$ be the size of the text file after it is bit-compressed. That is, A$_{bit}$/B=0.3. We deduce that A$_{TDC}$/A$_{bit}$=0.2/0.3=0.66. Therefore TDC achieves a compression ratio of approximately 33% over the bit-compression method and reduces the size of the files to around 800 megabytes.

We have also compressed the files using the Unix "compress" utility, which uses a variant of the Ziv and Lempel class of algorithms. We obtained a compression ratio of approximately 85%. Although this ratio is higher, we have noted above that LZ algorithms are unsuitable for database compression. The most important reason is that it is a global compression technique that is unable to support random tuple access and modification (including insertion and deletion) that are required for general database operations.

From the foregoing, the TDC method of the invention provides a new method for compressing tables, i.e., data organizable as tuples. TDC achieves its objectives without violating any operational requirements. It exhibits the following features:

Field mapping: Arbitrary field values may be mapped into numeric numbers. This step itself achieves compression. A record now becomes a collection of numbers.

Tuple ordering and field ranking: A record may be mapped into a single numeric number. In order to do so, the collection of fields may be ranked, and a tuple ordering rule must be chosen. Thus, different mappings are available, depending on the field ranking and ordering rule chosen.

Tuple differencing: A tuple may be represented as the numerical difference between itself and some other tuple. Since any two lexicographically close tuples share common attributes, their numerical correspondences are numerically close. Hence, their differences are numerically small, much smaller than the tuples themselves. With less storage required to store the difference, further compression is achieved.

Localized access: By partitioning the differences into blocks, with each block beginning with a full tuple rather than a tuple difference, decompression is localized to within a disk block. This prevents the costly operation of decompressing the entire table when only a small portion of the table is accessed.

Access methods: As TDC retains the tuple-structure within a table, conventional access methods may be used to provide random access to the compressed tuples, with little or no changes.

While the presently preferred form of the invention has been described, the following are potential variants of the technique:

(a) The difference relation may be represented in various different ways. For example, the differences may be expressed as tuples rather than as integers. Other innovative variants may be possible.

(b) Variations are also possible in the lower-level representations for the difference relation. Different codes may be used to represent or store the numerical difference (or tuple difference). For example, if a variable-length code were used, the number of bytes allocated to store each difference could be indicated by a count field such that if the count value is x, then the number of bytes allocated is some function f(x). The function f(x) determines the semantics of the count field. There are two commonly used classes of f: linear and exponential. In the former case, f(x)=ax for some integer a. Generally, a=1 so that x gives the number of bytes directly. In the latter case, $f(x)=a^x$ for a=2,3, . . . Other variants are possible.

(c) There are many possible definitions for the attribute ranking and tuple ordering rule. Each potential combination gives rise to different a tuple mapping rule, which naturally affects the amount of achievable compression from tuple differencing.

The invention is applicable to the compression and storage of very large databases where data are organizable as tables of tuples. During normal database operations, multiple accesses are made to the database where each access retrieves a large portion of the database, thus incurring many disk I/Os. The invention not only reduces the amount of I/Os, but also increases the efficiency of each I/O transfer because more data are fetched during each I/O.

The invention is also suitable for reducing the size of very large database to so that it can be stored on a relatively inexpensive mass storage medium, such as a hard disk of a personal computer, so that the database may be made available to more users.

Exemplary Computer-Implemented Software Embodiment

The principles of the invention may be applied in a variety of database and computer software applications. The next section describes one possible software implementation. The software implementation comprises an encoding module which compresses data according to the principles of the invention. Naturally, the decoding module to decompress the data follows the described process in reverse. Also, while the invention has particular utility as a data compression system and method, it can also serve as a data encryption system and method, by hiding or encrypting the head tuple. Without access to the head tuple, the difference tables are meaningless.

Figure 6:
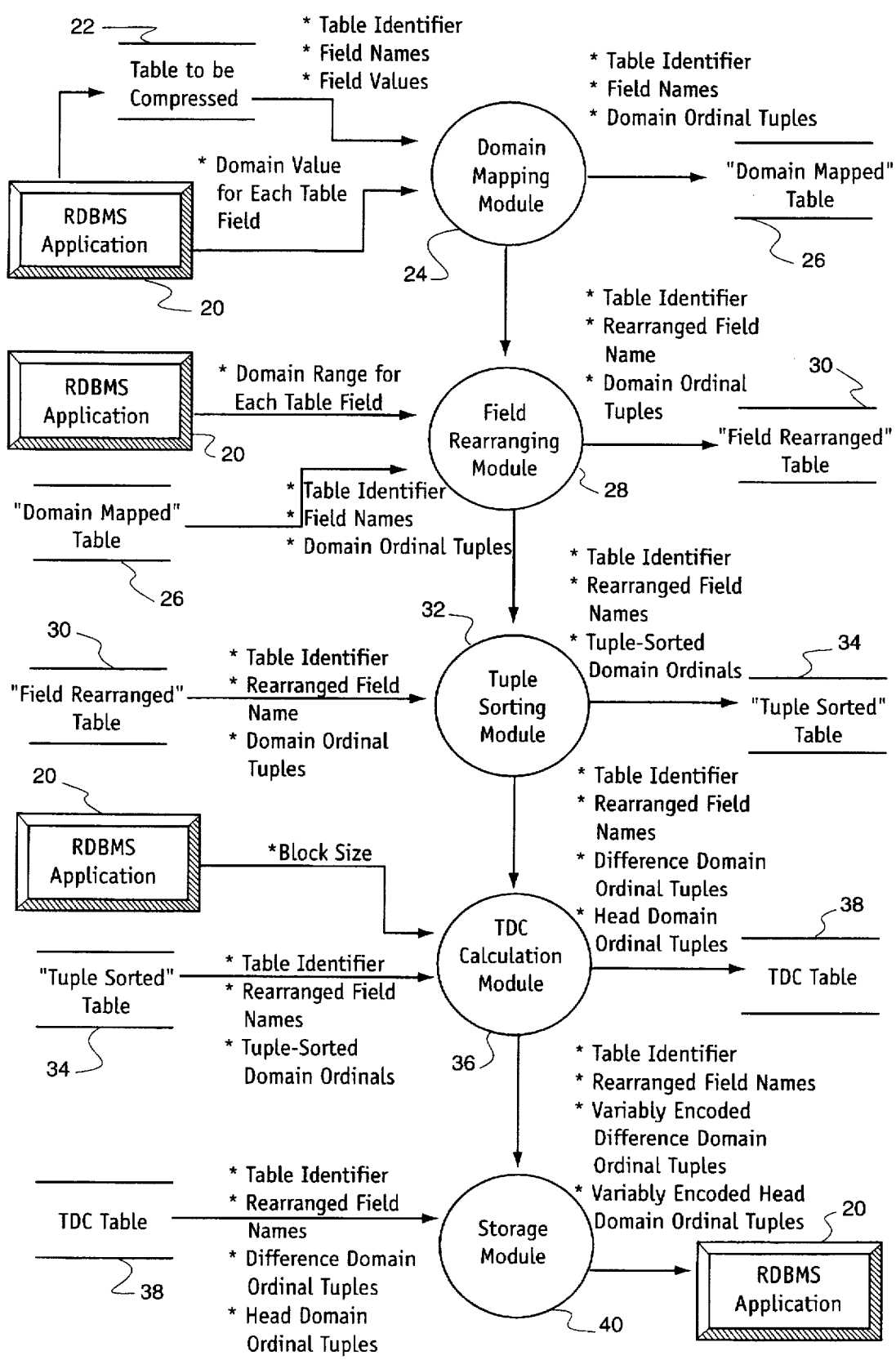
FIG. 6 is a data and process flow chart of the encoding modules according to an exemplary embodiment of the invention.

FIG. 6 is the data and process flowchart of the encoding module. This figure shows how the encoding module of the invention interfaces with the relational database management system application 20. Examples of relational database management system application 20 include Ingres Oracle or SYBASE.

The encoding module may be made up of several lower level modules which will now be described. The first module, domain mapping module 24 has as its primary function the mapping of field values to domain ordinals. Module 24 requires two principal inputs: (1) table to be compressed 22; and (2) domain range for each table field. The table to be compressed 22 will contain: the table name or some type of a table identifier; field names; and the values for each of those fields, namely field values.

As described above, each field name has an associated domain value. This domain value specifies the number of possibilities of the values that a particular field can assume. The domain mapping module 24 determines the ordinal position of a particular field value within the field's domain. This module 24 produces the domain mapped table 26. The domain mapped table 26 comprises the table name/identifier, the field names, and the domain ordinal tuples. The domain mapped table 26 and the other intermediate tables which will be discussed below may be stored in memory if the tables are not too large. If the intermediate tables are too large to be stored in memory, then they can be stored on the hard drive. To further save room on the hard drive, each intermediate table can be deleted after it has served its appropriate function.

After the domain mapped table 26 is produced, the field rearranging module 28 alters the order of the fields within the table. Field rearrangement is based upon each field's domain value. The field with the lowest domain value is placed first. The field with the next lowest domain value is placed second. This process continues until all the fields have been accordingly rearranged. The goal of the rearrangement process is to increase the likelihood of zero values being in the beginning fields for each tuple. As will be shown below, greater compression will occur for those tuples with the greater amount of leading zeros for a given tuple. The field rearranging module 28 outputs the result into the field rearranged table 30.

Next, the tuple sorting module 32 sorts the tuples that are in the field rearranged table 30 based on each tuple's mixed radix value. A single mixed radix number is calculated for each tuple. The following pseudocode is one implementation method for producing the mixed radix value. The pseudocode below illustrates how to transform the domain ordinals of a single tuple into its mixed radix representation. There are five fields that have the following domain ordinal values. The first field has a domain ordinal value of 0; the second has a value of 0; the third a value of 3; the fourth a value of 32; the fifth has a value of 32. The domain values for each field within that tuple are as follows: 4; 4; 4; 128; 128.

COMMENT: n=# of fields within a Table.
N=5
COMMENT: A.big( ) is an array which contains the field's Domain Value.
A.big(1)=4
A.big(2)=4
A.big(3)=4
A.big(4)=128
A.big(5)=128
Comment: a.small(b) is an array which contains the tuple's Domain Ordinals.
a.small(1)=0
a.small(2)=0
a.small(3)=3
a.small(4)=32
a.small(5)=32
sum=0
product=1
phi=0
FOR i=1 TO n
  product=1
  FOR j=(i+1) TO n
    product=product*ABS(A.big(j))
  NEXT j
  sum=sum+(a.small(i)*product)

NEXT i
phi=sum
END

The input values described above will generate the number 53,280, which is the single mixed radix representation of that entire tuple. The tuple sorting module 32 performs this type of calculation for each tuple within the field rearranged table 30. The tuples are then sorted according to their single mixed radix number in ascending order and placed in the tuple-sorted table 34.

The TDC calculating module 36 calculates the tuple differences within a predefined block. Thus the TDC calculating module 36 requires two inputs: the first being the block size of the data which can usually be obtained from the RDBMS application 20; and the second being the tuples from the tuple-sorted table labeled 34. The TDC calculating module 36 takes the first tuple of the tuple-sorted table 34 and stores that tuple as the head tuple within the TDC table 38 for the first block. The module 36 then reads in the next tuple and subtracts from it the previous tuple, which in this case is the head tuple. This difference is then stored in the TDC table 38. The next tuple from the tuple-sorted table 34 will be read and will have subtracted from it the preceding tuple's value.

The resulting tuple difference is stored in the TDC table 38. This differencing process will continue until the number of tuples have reached the block size. When the number of tuples has reached the block size, then the TDC calculating module 36 begins a new head tuple from which subsequent differences will ultimately be based. The following pseudocode illustrates how the head tuple and the subsequent differencing is accomplished within a block. Lastly, for this operation the domain ordinal values of each tuple are used in the differencing operation.

size=0
n=# of total tuples within the table
i=1
WHILE (i<=n)
IF (blocksize>size) THEN
    Set this tuple as the head tuple and store it in the TDC Table
    size=size of this head tuple
ELSE
    Store the result of the difference between Tuple(i) and Tuple (i+1)
    size=size+(size of this difference)
END IF
i=i+1
END WHILE Finally the storing module 40 takes the values from TDC table 38 and variably encodes them to achieve further compression. These variably encoded tuples are then stored within the RDBMS application 20. Both the head tuples and the difference tuples are variably encoded. Many encoding techniques exist to achieve the variably encoded result. The technique used here replaces any leading zeros of a tuple with an integer value representative of the number of leading zeros it had replaced.

Figure 7:
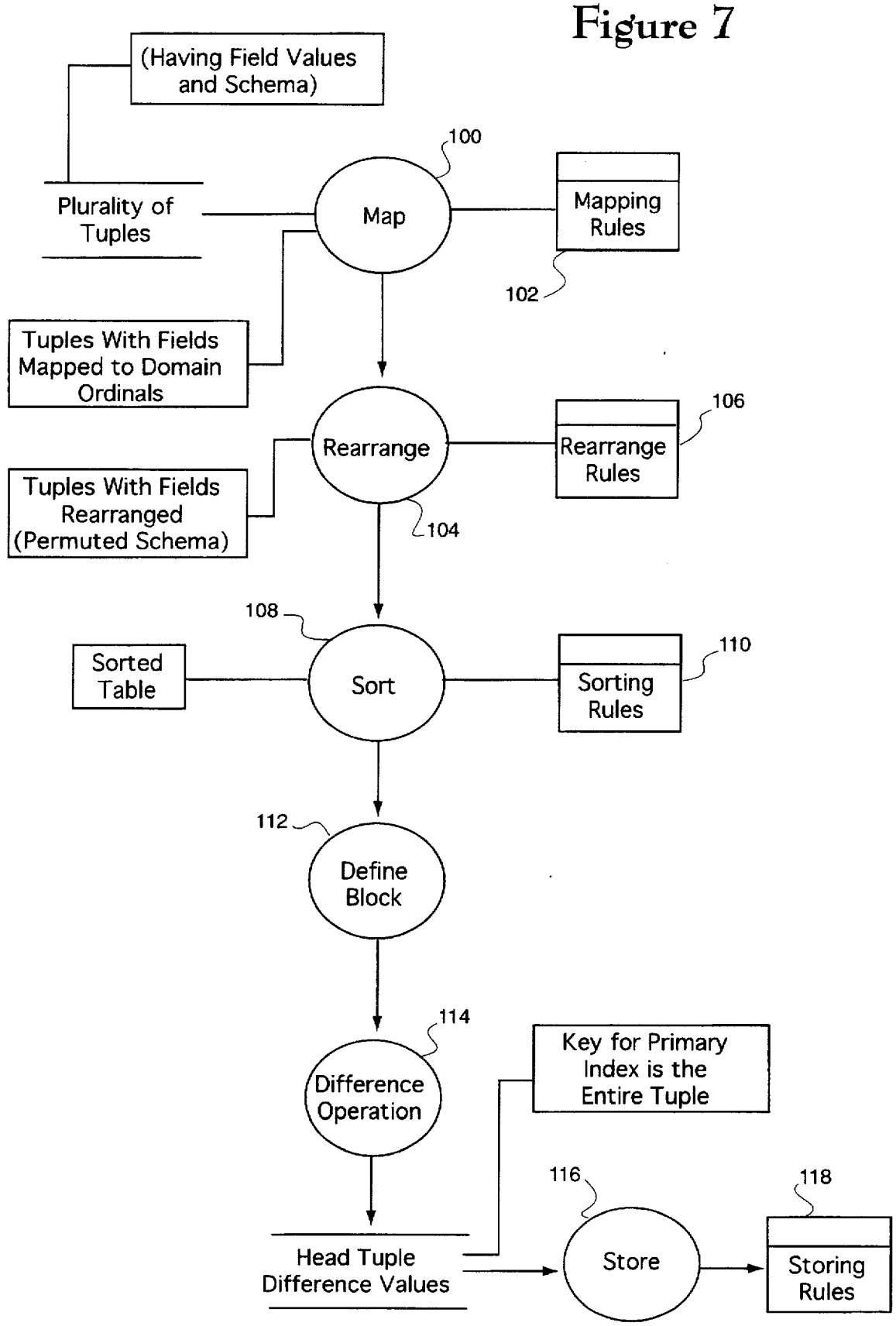
FIG. 7 is an entity relationship diagram further illustrating some of the principles of the invention.

By way of summary, the software embodiment of FIG. 6 performs the operations illustrated in FIG. 7. The input database, comprising a plurality of tuples having predefined field values according to a predefined schema, is mapped (operation 100) according to the predefined mapping rules 102. This mapping operation produces tuples with fields mapped to domain ordinals. Next, a rearrange operation 104 is performed according to predefined rearrangement rules 106. This produces tuples with fields rearranged into a permuted schema. The tuples are then sorted (operation 108) according to predefined sorting rules 110. This produces a sorted table. Then, if desired a block of predefined size may be established (operation 112) so that the sorted tuples are further operated upon in block-sized increments. These further operations involve difference operation 114, which produces a head tuple and a table of difference values to represent the remaining tuples in the block. This entire tuple may be used as the key for the primary index to the database. The tuple is then stored (operation 116) according to the predefined storing rules 118 of the database system.

Lastly, several other ways exist to perform differential coding instead of computing the difference between consecutive pairs of tuples. One alternative way is to establish the head tuple of each block as the reference tuple for its respective block. Then each succeeding tuple within the block is subtracted from the respective head tuple.

Another alternative is to establish the middle tuple of each block as the reference tuple for its respective block. Then each succeeding tuple within the block is subtracted from the respective middle tuple. Both of these alternatives are exemplified below.

Table (a) in FIG. 8 shows a relation $\mathcal{R}$ with five attribute domains $A_1, A_2, A_3, A_4, A_5$ denoting the employee number, department, job title, insurance grade and income in thousands, respectively. The size of each domain, i.e., the number of different attribute values, is 64, 8, 16, 64, 64, respectively. Table (b) shows the same relation, except that the attribute values have all been mapped to numbers. This is usually the raw form in which a statistical data set is available; a file of numerals corresponding to contiguous records. We preserve tuple identity by displaying them as individual tuples.

Figure 9:
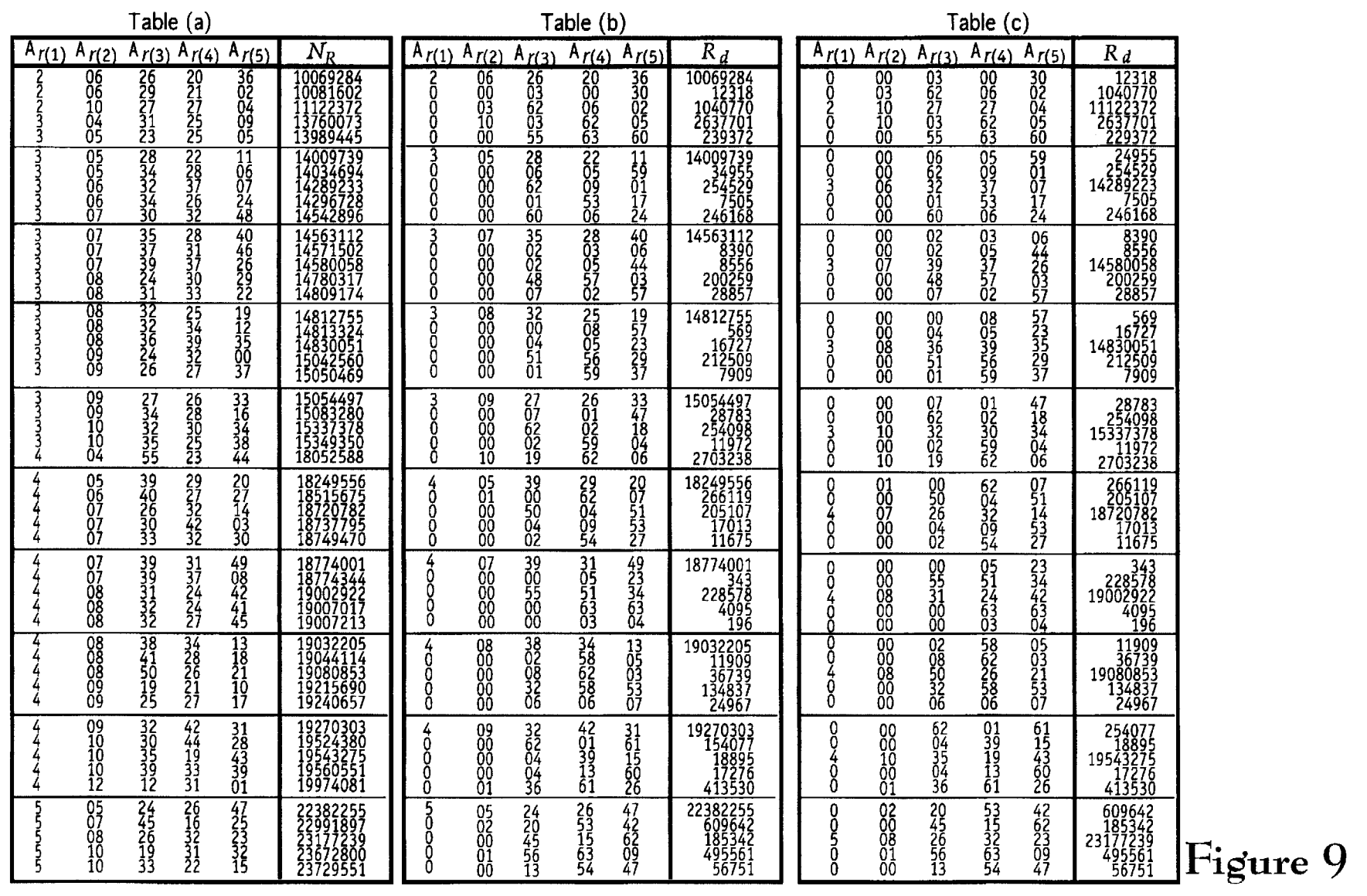

Continuing with the example relation $\mathcal{R}$ in FIG. 8, the results of the subsequent operations of TDC is illustrated in FIG. 9. The tuples are lexicographically ordered into Table (a). Notice that the attributes have been reordered under the permutation $\tau$ defined as:

$$\tau = \begin{pmatrix} 12345 \\ 23451 \end{pmatrix}$$

Column $N\mathcal{R}$ shows the ordinal numbers of the corresponding tuples.

Due to the similarity among tuples of a block, one may capture the difference among these tuples instead of storing the tuples explicitly. If these differences require less space for storage on average than the original tuples, compression is achieved. One way of such differential coding is to designate a tuple in a block as a reference tuple and encode all other tuples in the block with respect to the preceding tuple. We illustrate two possibilities with Table (b) and (c) in FIG. 9, where the reference tuples are the first and middle tuple of each block respectively.

In Table (b), the reference tuple of block 1 is <2,06,26, 20,36> or 10069284 numerically. The four differences in the same block with respect to it are: 12318=10081602−10069284, 1040770=11122372−10081602, 2637701=13760073−11122372 and 229372=13989445−13760073.

In Table (c), the reference tuple of block 1 is <2,10,27, 27,04> or 11122372 numerically. Tuples before and after the reference tuple are subtracted differently. The two differences before the middle tuple are: 12318=10081602−10069284 and 1040770=11122372−10081602 and the two differences after are: 2637701=13760073−11122372 and 229372=13989445−13760073.

Our invention permits the use of any form of differential coding within a block. The above examples illustrated three possibilities. In general, we may choose any tuple in the block as the reference tuple and encode the other tuples with respect to it.

Since the differences are numerically smaller than the tuples, they require fewer bytes of storage, as illustrated by the leading zero components in each tuple difference. By using run length coding to encode these components, compression is achieved. For instance, the first difference in block 1 of Table (b) <0,00,03,00,30> is encoded into <2,03,00,30> where the two leading zero components are replaced by a count of 2.

In essence, TDC performs differential coding on tuples of a relation that is totally ordered by a relation $\phi$, hence giving rise to its name. The result of encoding is the set of differences as illustrated by column $R_d$ of Table (b) in FIG. 9. The differences, which are stored in binary representation, are actually the bit-wise concatenation of the respective tuple-differences in binary representations. For instance, the first tuple-difference is:

$$0_{10}\ 00_{10}\ 03_{10}\ 00_{10}\ 30_{10}$$
$$=000_2\ 0000_2\ 000011_2\ 000000_2\ 011110_2$$
$$=0000_2\ 0000_2\ 0000_2\ 0011_2\ 0000_2\ 0001_2\ 1110_2$$
$$=00030\text{1e}_{16}$$
$$=12318_{10}$$

Supporting Standard Database Operations With the Alternative Differencing Approaches Since our compression method is designed for use at the lowest levels of a database system, it is important to understand how it might interact with other system components, and particularly, whether its use might require changes to their structure. In this section, we demonstrate that no rethinking or redesign of other database system components is required, and that our method may be integrated cleanly with standard approaches to structuring them. In particular, we now consider how access mechanisms may be constructed on the coded tuples, and how the tuples may be retrieved and modified. We focus on demonstrating the use of our method with standard access and retrieval mechanisms.

We have restricted our attention to these basic operations rather than to queries for several reasons: (1) All queries, simple or complex, reduces to a set of basic tuple operations. (2) The variety of queries is too large to derive a set of representative, typical queries. The feasibility of these operations on a compressed database carries over to more complex queries which are built upon them.

Access Method With The Alternative Differencing Approaches

Figure 10:
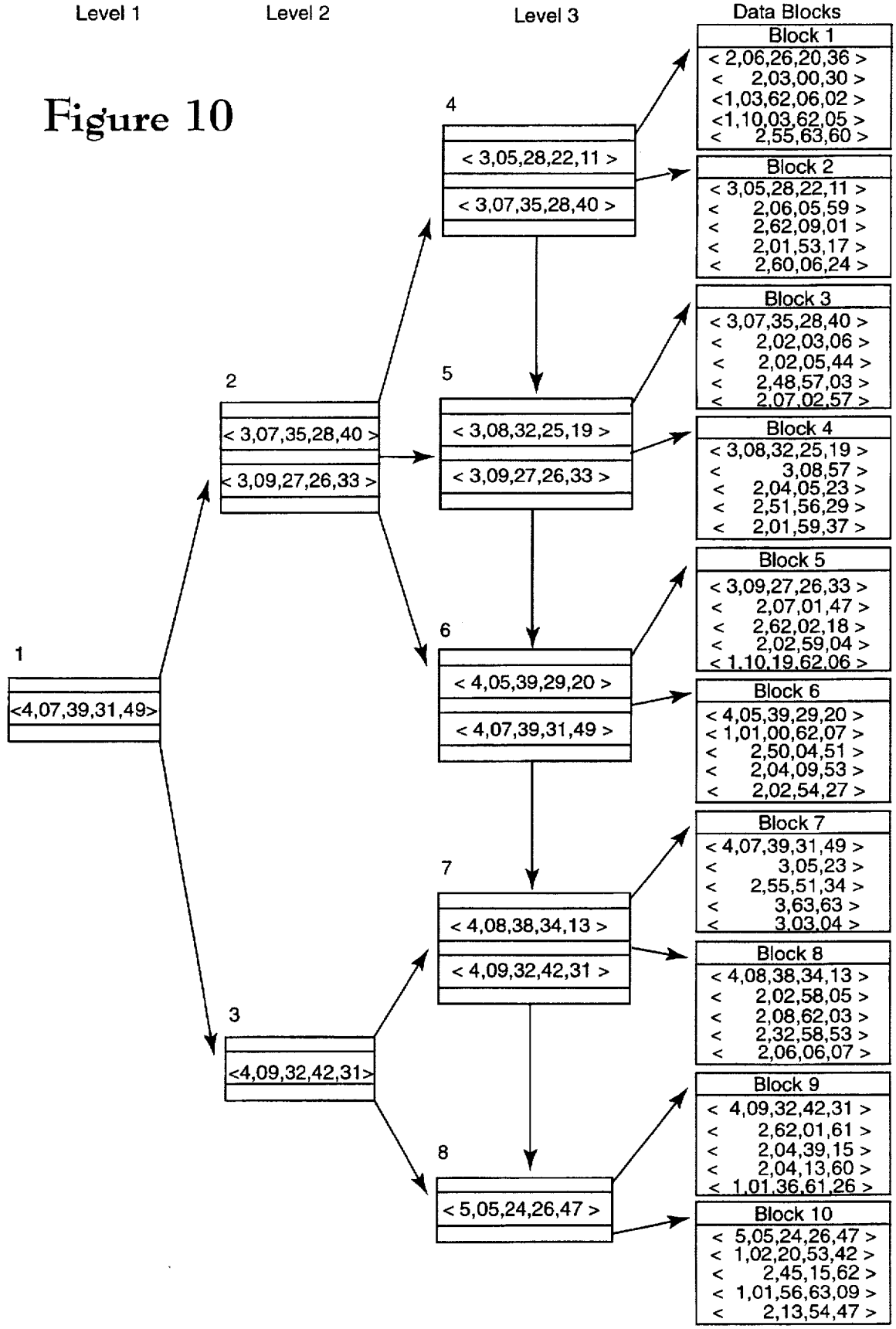
FIG. 10 is a tree structure chart illustrating the primary index and showing the manner of storing data blocks containing difference tuples in $\phi$ order, illustrating that the search key is an entire tuple with each block beginning with a reference tuple and followed by difference tuples.

FIG. 10 shows an order-3 primary $B^+$ tree index constructed using the data block of Table (b) in FIG. 9. Notice that the search key in the index is an entire tuple. In conventional primary indices, the search key is usually only an attribute value.

Operations on the tree-index are performed as usual. Suppose a query wishes to locate the tuple <4,06,40,27,27> [which from Table (a) in FIG. 9 is located in block 6]. Starting with the key in the root index node, index node 2 is searched next since it is lexicographically smaller than the root key. There are two search keys in node 2. Following the link corresponding to the smaller of the differences between the tuple and each of the keys, index node 6 is searched. We find again that the second search key is closer to the tuple than the first. This leads us to data block 6, where the tuple resides. This block is now transferred to main memory and decompressed. Thus, traversing the index is the same except that key comparison requires measuring the difference between the key and the target tuple.

When tuples are to be retrieved given certain attribute values only, secondary indices based on the primary index above may be constructed. FIG. 11 shows an order-3 $B^+$ tree index where $A_5$ is the search key. Since the relation is physically clustered via $\phi$, the index is nonclustering and secondary. This explains the extra level of indirection provided by the buckets in the figure. Suppose we wish to execute $\sigma_{A5=39}(R)$. Starting with the root index node, we follow the pointer to the last index node <42> since 39 is after the last key 33 in the root node. Following the first link in this index node, bucket 5 is reached, indicating that the tuple resides in disk block 9.

Therefore, the combination of reference tuples and conventional indices realize random localized access to a compressed database. Although we have illustrated the use of tree indices, we do not preclude the use of other methods such as hashing.

Tuple Insertion and Deletion With The Alternative Differencing Approaches

Suppose we wish to insert in our previous database the tuple t=<3,07,37,31,50>. Using the primary index, we identify data block 3 as the block for insertion. The tuple is found to lie lexicographically between the second and third tuple in the block. FIG. 12 shows the result of tuple insertion. Notice that only tuple succeeding t is recoded, and that the changes are confined to the affected block. If the inserted tuple is lexicographically smaller than all the other tuples in the block, then it becomes the new reference tuple in the block. The process of tuple deletion is similar. Tuple modification is just a combination of tuple insertion and deletion.

While the invention has been described in its presently preferred form, with several examples and an exemplary software implementation given, it will be understood that the invention is not limited to these examples or this software implementation. Rather, the invention is capable of modification without departing from the spirit of the invention as set forth in the appended claims.

What is claimed is:

1. A method for compressing a database consisting of a plurality of tuples, each tuple having predetermined fields arranged according to a predetermined schema, the method comprising:

mapping said tuples according to predetermined mapping rules such that said fields are mapped to domain ordinals representing field values to thereby define a plurality of domain ordinal tuples;

sorting said domain ordinal tuples according to predetermined sorting rules;

converting said domain ordinal tuples into a reference tuple and a table of difference values by subtracting a domain ordinal tuple from its succeeding neighbor;

defining a data block of a predetermined size and performing said converting step on groups of domain ordinal tuples to fit said defined data block size, wherein said predetermined size of said data block is determined to physically conform to the data block size of a storage system used to store said database;

storing said reference tuple and said table of difference values according to predetermined storing rules, the stored reference tuple and the stored table of difference values being a compressed representation of said database.

2. The method of claim 1 further comprising rearranging said plurality of domain ordinal tuples according to predetermined rearrangement rules to thereby alter the schema of said domain ordinal tuples from said predetermined schema.

3. The method of claim 1 wherein said sorting step is performed by a sorting operation upon said domain ordinal tuples.

4. The method of claim 1 wherein said database employs a primary index key, said method further comprising using said reference tuple and said difference values as the key for the primary index of said database.

5. The method of claim 2 wherein said rearrangement rules alter the schema such that the fields are rearranged by ascending domain size.

6. The method of claim 1 wherein said sorting rules produce a table of domain ordinal tuples sorted in ascending mixed-radix order.

7. The method of claim 1 wherein said database employs a primary index key and wherein said reference tuple and said difference values are represented as mixed-radix numbers, and using said mixed-radix number representations for said reference tuple and said difference values as the key for the primary index of said database.

8. The method of claim 1 further comprising concealing said reference tuple to thereby conceal the contents of said database.

9. The method of claim 1 wherein said reference tuple is head tuple of sorted said domain ordinal tuples.

10. The method of claim 1 wherein said reference tuple is a middle tuple of said sorted said domain ordinal tuples.

11. The method of claim 1 wherein said reference tuple is a tuple other than head tuple of said sorted said domain ordinal tuples.

12. A method for encrypting a database consisting of a plurality of tuples, each tuple having predetermined fields arranged according to a predetermined schema, the method comprising:

mapping said tuples according to predetermined mapping rules such that said fields are mapped to domain ordinals representing field values to thereby define a plurality of domain ordinal tuples;

sorting said domain ordinal tuples according to predetermined sorting rules;

converting said domain ordinal tuples into a reference tuple and a table of difference values by subtracting a domain ordinal tuple from its reference tuple;

defining a data block of a predetermined size and performing said converting step on groups of domain ordinal tuples to fit said defined data block size, wherein said predetermined size of said data block is determined to physically conform to the data block size of a storage system used to store said database:

storing said reference tuple and said table of difference values according to predetermined storing rules such that said reference tuple is rendered inaccessible, the stored reference tuple and the stored table of difference values being a compressed and encrypted representation of said database.

13. The method of claim 12 further comprising rearranging said plurality of domain ordinal tuples according to predetermined rearrangement rules to thereby alter the schema of said domain ordinal tuples from said predetermined schema.

14. The method of claim 12 wherein said sorting step is performed by a sorting operation upon said domain ordinal tuples.

15. The method of claim 12 wherein said database employs a primary index key, said method further comprising using said reference tuple and said difference values as the key for the primary index of said database.

16. The method of claim 13 wherein said rearrangement rules alter the schema such that the fields are rearranged by ascending domain size.

17. The method of claim 12 wherein said sorting rules produce a table of domain ordinal tuples sorted in ascending mixed-radix order.

18. The method of claim 12 wherein said database employs a primary index key and wherein said reference tuple and said difference values are represented as mixed-radix numbers, and using said mixed-radix number representations for said reference tuple and said difference values as the key for the primary index of said database.

19. The method of claim 12 further comprising concealing said reference tuple to thereby conceal the contents of said database.

20. The method of claim 12 wherein said reference tuple is head tuple of sorted said domain ordinal tuples.

21. The method of claim 12 wherein said reference tuple is a middle tuple of said sorted said domain ordinal tuples.

22. The method of claim 12 wherein said reference tuple is a tuple other than head tuple of said sorted said domain ordinal tuples.

23. The method of claim 12 wherein said reference tuple is encrypted and thereby rendered inaccessible.

24. The method of claim 12 wherein said reference tuple is hidden and thereby rendered inaccessible.

25. An apparatus for encrypting data within a database, said data forming records having rows of common fields, said rows having field values for said common fields, and said common fields having domain values, comprising:

translation means for translating said field values of said rows into said domain values representing said field values to define translated records;

ordering means coupled to said translation means for rearranging said domain values and for also sorting said translated records according to predetermined sorting rules;

reference establishing means coupled to said translation means and said ordering means for defining a reference frame in calculating differences between said rows and for encrypting said frame reference;

difference calculation means coupled to said translation means and said ordering means and said reference for establishing means for calculating the difference between adjacent rows relative to said reference frame;

storage means coupled to said reference establishing means and said difference calculation means for storing said encrypted reference frame and said difference.

* * * * *

UNITED STATES PATENT AND TRADEMARK OFFICE
CERTIFICATE OF CORRECTION

PATENT NO. : 5,678,043
DATED : October 14, 1997
INVENTOR(S) : Ng et al.

Page 1 of 2

It is certified that error appears in the above-identified patent and that said Letters Patent is hereby corrected as shown below:

Column 3, Line 49 after "is" delete "$\sigma_{dept:marketing}$" and insert --$\sigma_{dept=marketing}$--

Column 4, Line 29, delete "Modeson" and insert --Madison--

Column 5, Line 27, delete "R→NR" and insert --$R \to N_R$--

Column 5, (A.1) Delete "$N_R=\{0,1,...,|R|-1\}$ and $\|R\|= \prod_{i=1}^{n} |A_i|$ and insert --"$N_R=\{0,1,...,|R|-1\}$ and $\|R\|= \prod_{i=1}^{n} |A_i|$--

Column 5, Line 44, after "all" Delete "$e\epsilon \overline{NR}$ and $i=1,2...,n-1$" and insert --$e\epsilon N_R$ and $i=1,2...,n-1$--

UNITED STATES PATENT AND TRADEMARK OFFICE
CERTIFICATE OF CORRECTION

PATENT NO. : 5,678,043
DATED : October 14, 1997
INVENTOR(S) : Ng et al.

It is certified that error appears in the above-identified patent and that said Letters Patent is hereby corrected as shown below:

Column 6, Line 5, after "Column" delete "NR" and insert --$N_R$--

Column 12, Line 44, after "Column" delete "NR" and insert --$N_R$--

Signed and Sealed this

Sixth Day of January, 1998

Attest:

BRUCE LEHMAN

Attesting Officer

Commissioner of Patents and Trademarks